United States Patent

Peres et al.

[11] Patent Number: 5,865,025
[45] Date of Patent: Feb. 2, 1999

[54] FUEL INJECTION STUB FOR A RAMJET OPERATING AT A HIGH MACH NUMBER

[75] Inventors: Patrick Peres, St Aubin de Medoc; Julien Lansalot, Bordeaux; Christophe Balemboy, Merignac, all of France

[73] Assignee: Aerospatiale Societe Nationale Industrielle, Paris, France

[21] Appl. No.: 881,353

[22] Filed: Jun. 24, 1997

[30] Foreign Application Priority Data

Jun. 24, 1996 [FR] France .................................. 96 07803

[51] Int. Cl.⁶ .................................................. F02K 7/10
[52] U.S. Cl. ........................................... 60/267; 60/270.1
[58] Field of Search .................................. 60/267, 270.1, 60/739, 740, 742

[56] References Cited

U.S. PATENT DOCUMENTS

| | | |
|---|---|---|
| 2,848,427 | 8/1958 | Rubens . |
| 3,699,773 | 10/1972 | Schuning et al. . |
| 3,727,409 | 4/1973 | Kelley et al. . |
| 4,821,512 | 4/1989 | Guile et al. .............................. 60/270.1 |
| 4,951,463 | 8/1990 | Lee et al. . |
| 5,214,914 | 6/1993 | Billig et al. ............................. 60/270.1 |
| 5,220,787 | 6/1993 | Bulman .................................. 60/270.1 |
| 5,727,382 | 3/1998 | Chevalier et al. ...................... 60/270.1 |

FOREIGN PATENT DOCUMENTS 2610951  2/1987  France .

*Primary Examiner*—Louis J. Casaregola
*Attorney, Agent, or Firm*—Fisher,Christen&Sabol

[57] ABSTRACT

A fuel injection stub (6) for a ramjet is designed to operate at a high Mach number. According to the invention, said stub includes a carbon-carbon composite body (10), in which a rail of elementary injectors is arranged, and a nose piece (11) consisting of a thin skin of carbon-carbon composite in at least approximately the shape of a dihedron, the edge (11A) of which has a radius of curvature (r) at most equal to 2 mm and the angle of which is at most equal to 15°. Means (23, 27) for injecting a coolant into the sealed chamber (18) are arranged in said body (10), said injection means producing a number of jets of pressurized coolant striking the concave face of said skin (11).

17 Claims, 4 Drawing Sheets

FUEL INJECTION STUB FOR A RAMJET OPERATING AT A HIGH MACH NUMBER

BACKGROUND OF THE INVENTION

The present invention relates to a fuel injection device for a ramjet operating at a high Mach number, for example of about 12 to 15.

It is known that ramjets are particularly advantageous for propelling hypersonic aircraft (missiles, airplanes, etc.) since they allow operation over a wide range of Mach numbers, for example from 2 to 15, and they have a low specific fuel consumption. Depending on the application peculiar to an aircraft, and possibly on the flight phase of the latter, the fuel used may be a liquid hydrocarbon, such as kerosene for example, or a gas, such as hydrogen or methane, for example.

It is also known that a ramjet includes, on the one hand, at least one oxidizer inlet, usually consisting of an air duct or an air intake, which directs an oxidizer flow (i.e. air) toward a combustion chamber and, on the other hand, at least one injection device which enables the fuel to be injected into said oxidizer flow so as to obtain a flux of oxidizer/fuel mixture which is ignited in said combustion chamber.

In ramjets designed to operate at a relatively low Mach number (for example up to Mach 2), such a fuel injection device may consist of a number of elementary injectors arranged in the internal wall of the ramjet, on the periphery of the oxidizer flow.

However, for operation at high Mach numbers, when combustion in the ramjet takes place in a supersonic or hypersonic flow, the fuel can no longer be injected just at the internal wall of the ramjet. This is because, in this case, the penetration of the jets of fuel into the oxidizer flow is too low for it to be possible to obtain good mixing of the oxidizer and the fuel within said flow, so combustion is poor or even impossible. Of course, such a drawback becomes more acute the greater the transverse dimensions of the oxidizer flow.

Thus, in order to remedy this situation, injection devices in the form of rails have already been provided, these devices having a number of elementary injectors distributed over their length and arranged in said oxidizer flow, transversely to the latter, while the ends of said rails are fastened to opposite walls of said ramjet. Such an injection device is generally called an "injection stub" and it is used either alone or in combination with fuel injection in the wall.

By using injection stubs, it is thus possible to obtain a satisfactory oxidizer/fuel mixture over the entire cross section of the oxidizer flow. More generally, the injection stubs installed in a hypersonic ramjet make it possible:

to feed fuel into the entire oxidizer flow, despite the low penetration of the jets of fuel into an oxidizer flow at hypersonic velocities;

to increase the proportion of fuel in the oxidizer/fuel mixture;

to assist in the ignition of the oxidizer/fuel mixture and to stabilize the flame; and to help compress the oxidizer flow, by reducing the rate of flow of fuel taken up by the ramjet.

Such injection stubs, which are exposed to the action of the oxidizer flow, therefore each behave, from the aerodynamic standpoint, as an airfoil embedded at its ends in two opposite walls of the ramjet. In addition, on that side of their nose which receives the oxidizer flow, said injection stubs must have a leading edge with a small radius for limiting the pressure drops which would restrict the propulsive performance of the ramjet and could even lead to choking of the oxidizer flow, which can remain hypersonic in the combustion chamber only if the velocity of the oxidizer upstream is sufficiently high.

However, the heat-up of said nose produced by the hypersonic oxidizer flow is approximately inversely proportional to the square root of the radius of the leading edge of said nose. Thus, a nose with a small leading-edge radius heats up a great deal. Moreover, it will be noted that, since said injection stubs are arranged inside the ramjet, it is impossible to cool them by radiation with the air through which the aircraft propelled by said ramjet is flying. Such a nose is therefore exposed to very high temperatures: about 5000K by an aircraft flying at Mach 12 at an altitude of about 30 km. It is therefore necessary to construct the injection stubs from materials such as ceramics, the radius of said leading edge being about 3 to 5 mm. However, in view of the current processes for producing ceramic components, it may readily be imagined that the precision manufacture of ceramic injection stubs, is necessarily lengthy and expensive.

SUMMARY OF THE INVENTION

The object of the present invention is to remedy these drawbacks. It relates to an injection stub, for a hypersonic ramjet, which has a leading edge of small radius and which at the same time can be made of a carbon—carbon composite material.

To this end, according to the invention, the fuel injection stub for a ramjet which is designed to operate at a high Mach number and which includes a combustion chamber into which an oxidizer flow is introduced, said stub including a nose receiving said oxidizer flow and forming a rail of elementary fuel injectors, said rail being arranged in said oxidizer flow transversely to the latter and distributing said fuel in said oxidizer flow, is noteworthy:

in that it includes:
  a body of carbon-carbon composite, in which said rail of elementary injectors is arranged, and which, at least on the side where said nose is located, has a cross section in the shape of a wedge, the angle of which is at most equal to 15° and the edge of which is cut over at least part of its length in order to form at least one end facet; and
  a nose piece consisting of a thin skin of carbon-carbon composite in at least approximately the shape of a dihedron, the edge of which has a radius of curvature at most equal to 2 mm and the angle of which is equal to that of said wedge;

in that said skin is joined to said body, in a sealed manner, with its faces pressed against the faces of said wedge, so that a sealed chamber is delimited, in the concavity of said skin, between the latter and said end facet of said body; and in that, in said body, there are arranged:
  means for injecting a coolant into said sealed chamber, these injection means comprising nozzles arranged in said facet of said body in order to produce a number of jets of pressurized coolant which are distributed along said facet and strike the concave face of said skin, at least in the region of its edge; and
  means for removing said coolant after impact of said jets against the concave face of said skin.

Thus, since the nose is formed by a thin skin whose internal concave face is cooled effectively by the impact of the jets of coolant, the external convex face of said skin, i.e. the leading edge of the nose, is also cooled effectively by thermal conduction through the thickness of said thin skin so that the temperature to which said nose is exposed may be only about 1000° C. to 2000° C. (compared with 5000K mentioned above), although said nose is slender (15° dihedral angle) and has a small leading-edge radius (at most equal to 2 mm). It is because of this effective cooling that said stub may be made of carbon-carbon composite.

In order to achieve this kind of effective cooling of the nose, it has been found that it was advantageous for:
- the thickness of said thin skin of the nose to be at most equal to 2 mm;
- the carbon-carbon composite constituting said thin skin to have a thermal conductivity in the thickness of about 70 W/(m.K) in the range of use temperatures; and
- the coolant to be a low-temperature gas, for example hydrogen at a temperature of about 100K to 300K.

Of course, it will be understood from the aforesaid that the thickness, thermal conductivity and nature of said thin skin, on the one hand, and the temperature, pressure, flow rate and nature of the coolant, on the other hand, are all parameters enabling the temperature of said thin skin to be adjusted.

For example, a nose piece having a thickness of about 1 mm, the constituent material of which has a transverse thermal conductivity (parallel to the thickness) of about 70 W/(m.K), and having a 12° dihedral angle and a 1.5 mm leading-edge radius is raised to a temperature close to 1500° C. for a Mach number equal to 12 if hydrogen is used, as coolant gas, at a temperature of 100K to 300K and at a pressure of about 10 to 15 bar with a flow rate of about 2 to 5 g/s for each cm of length of leading edge.

From such a configuration, it is, for example, quite clear that:
- if hydrogen is used at a different temperature, it will be possible, all other things being equal, to maintain the thin skin temperature by modifying said flow rate;
- if the constituent material of the thin skin withstands a temperature greater than 1500° C., for example 2000° C., this constituent material may have a thermal conductivity of less than 70 W/(m.K) or the cooling may be less powerful;
- etc.

Moreover, it will be noted that the injection stub according to the present invention is not limited to high Mach numbers greater than 10. This is because, if the aircraft is in a flight phase during which the Mach number is less than 10, the coolant may be an ergol, which has a cooling power less than that of hydrogen but which is sufficient to cool the nose at the Mach number in question. All that then remains is to design the coolant feed for the injection stub so that the latter receives an appropriate coolant during each flight phase of the aircraft. Advantageously, the coolant may consist of fuel for said ramjet. Thus, it is not necessary to provide, on board the aircraft, a special coolant tank, this coolant being taken off directly from the fuel feed. In addition, after impact of the coolant against the internal concave face of the nose skin, said removal means can recover the coolant and reinject it into the combustion chamber of the ramjet, thus increasing the propulsive performance of the ramjet.

Recovery of the coolant can take place either inside or outside said injection stub and the recovered coolant can be injected into the combustion chamber either directly or through the elementary fuel injectors of said stub. Optionally, between its recovery and its reinjection into the combustion chamber, said coolant may be used to cool an element of said ramjet, for example the shroud of an air intake.

Of course, for good recovery of the coolant it is necessary to take into account the pressure differences between the injected fuel and the recovered fuel, the latter being expanded and at a lower pressure. It is necessary to ensure that the high-pressure fuel flows into the low-pressure recovered fuel. Optionally, a supercharger may be provided in the recovered fuel circuit in order to increase the pressure.

In one advantageous embodiment, said carbon-carbon composite skin, from which said nose piece is formed, comprises:
- a woven fibrous structure, the weft yarns of which are distributed at several levels in the thickness of said skin and each of the warp yarns of which passes around weft yarns at different levels; and
- a matrix which encapsulates said fibrous structure and consists of pyrolyzed and graphitized pitch.

By virtue of such a construction, it is possible to reach the thermoconductivity value mentioned hereinabove, while still obtaining a thin and scarcely permeable skin. The woven fibrous structure may be of the type described in French Patent FR-A-2,610,951.

It should be pointed out that said nose piece may be obtained by folding said fibrous structure about a direction parallel to said weft yarns (thereby avoiding possible fold damage), after which said folded fibrous structure is impregnated with pitch and then pyrolyzed and graphitized. In the rigid skin thus obtained, the edge of the nose piece is parallel to the weft yarns of said woven fibrous structure.

Moreover, the composite body of said stub may be formed from a three-dimensional fibrous structure, likewise encapsulated in a pitch-based carbon matrix. Thus, the thermal conductivity of said composite body is also high and said body is compatible with the skin as regards expansions.

The skin and the body of said stub are advantageously fastened to each other by carbon adhesive bonding. To do this, a phenolic adhesive is used which contains carbon particles, so that, by pyrolyzing, said adhesive is converted into carbon. Such an adhesive exhibits mechanical and chemical properties compatible with the mechanical and thermomechanical stresses and with the thermal antioxidation treatments (see below) which said stub undergoes.

Optionally, the graphite adhesive bonding of the skin to the body is reinforced by fixing means made of carbon (nails, screws) which pass through said skin and are fixed into the body.

After joining the skin to the body, an antioxidation protection heat treatment is carried out with one or more depositions of silicon carbide. These depositions are adjusted in terms of thickness and porosity so as not to reduce the conductivity of the skin appreciably.

Thus, according to the invention, a homogeneous injection stub is obtained which is made entirely of carbon, is protected against oxidation with a thin skin meeting the requirements of conductivity, of mechanical integrity and of stiffness, and has a body with a three-dimensional architecture making it possible to meet the requirements of conductivity and of external and internal mechanical resistance, especially resistance to the injection pressure of the gases.

In one particular embodiment, intended for an aircraft having to fly at Mach 12 with a nose having to withstand a temperature close to 1500° C., the injection stub according to the present invention is noteworthy in that:
- the skin makes a dihedral angle of 12° and has a leading-edge radius equal to 1.5 mm;
- the skin has a thickness of about 1 mm and its carbon-carbon composite constituent material has a transverse thermal conductivity of about 70 W/(m.K);

the coolant is hydrogen at a temperature of 100K to 300K and at a pressure of about 10 to 15 bar; and the flow rate of the coolant is about 2 to 5 g|s for each cm of length of said leading edge.

Said means for removing the coolant may include:

at least one longitudinal groove made on the surface of said body and closed off by one face of said nose piece; and an array of transverse surface grooves bringing said sealed chamber into communication with said longitudinal groove and also closed off by said nose piece.

Likewise, said fuel injection rail and said coolant injection means may include longitudinal feed channels and transverse injection channels, all these being made in said body of the stub.

In order better to inject the fuel into the oxidizer flow, it is advantageous for said fuel injection rail to be arranged on that side of the stub which is opposite the nose. Moreover, in order further to improve the injection of fuel into the oxidizer and the fuel/oxidizer mixture, the fuel injection rail may include series of separate elementary injectors, some of them injecting fuel in the direction of the oxidizer flow and the others injecting fuel obliquely into said flow.

In this case, the body of the injection stub may include, on the side opposite said nose, a projecting central longitudinal base rib, at least one series of elementary injectors being arranged in said base rib and injecting fuel in the direction of the oxidizer flow, while at least two series of elementary injectors injecting fuel obliquely into said flow are arranged on each side of said base rib.

Moreover, in the usual manner, the body of the injection stub includes, at its ends, heads which are designed to anchor the stub in opposite walls of the ramjet and to feed said stub with fuel and coolant.

In this case, it is advantageous for said nose skin to at least partly cover said heads so that this skin is held in place by being anchored in said walls of the ramjet. Thus, the nose piece and said body are more securely fastened together.

BRIEF DESCRIPTION OF THE DRAWINGS

The figures of the appended drawing will make it clear how the invention can be realized. In these figures, identical references denote similar elements.

FIG. 8 shows, partially and on a larger scale, said nose piece near its leading edge in order to demonstrate diagrammatically the fabric of which the reinforcement of said piece is composed.

DETAILED DESCRIPTION OF THE INVENTION

Figure 1:
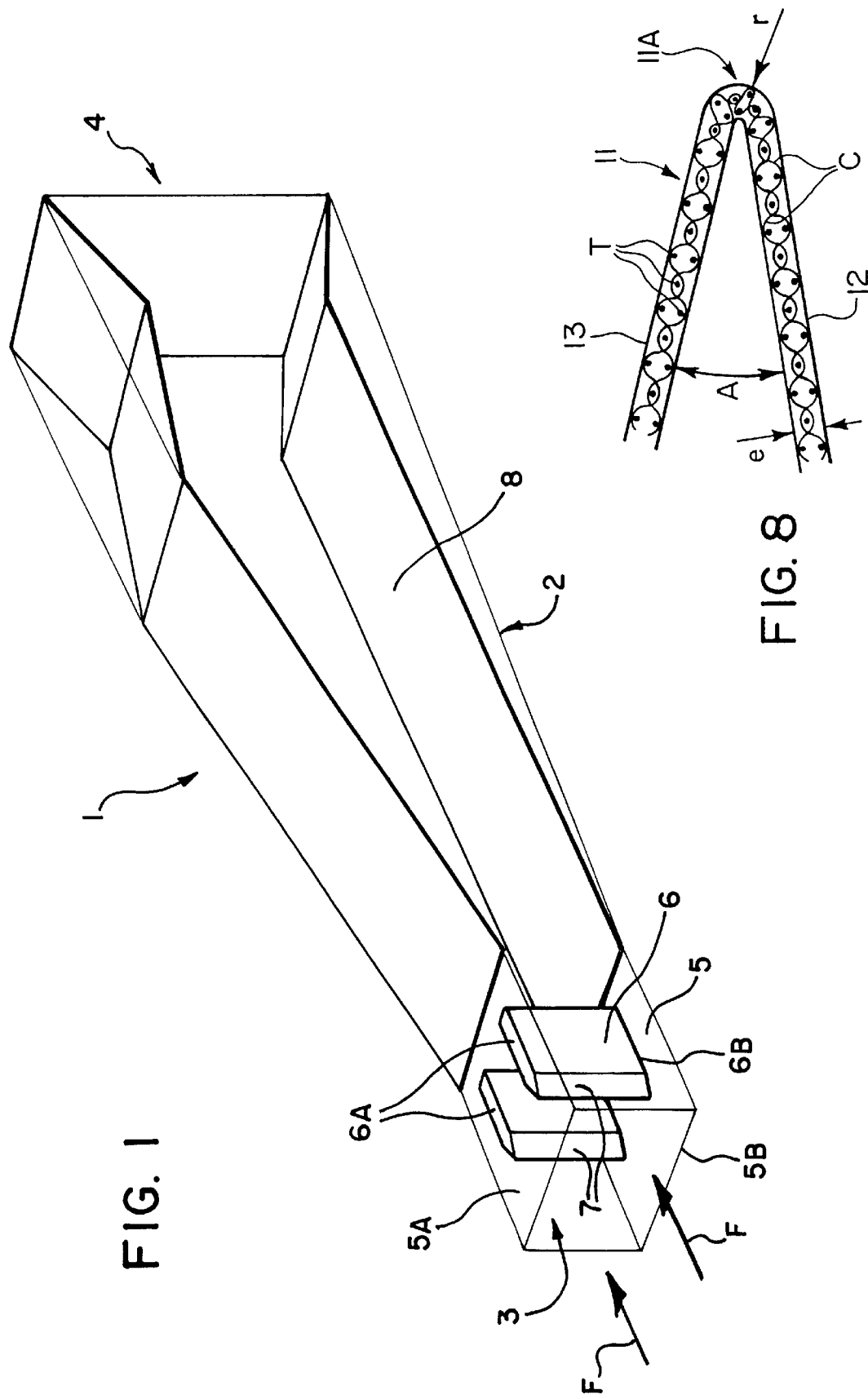
FIG. 1 is a highly diagrammatic perspective view of an illustrative embodiment of a ramjet provided with fuel injection stubs, it being assumed that the casing of said ramjet is transparent.
Figure 2:
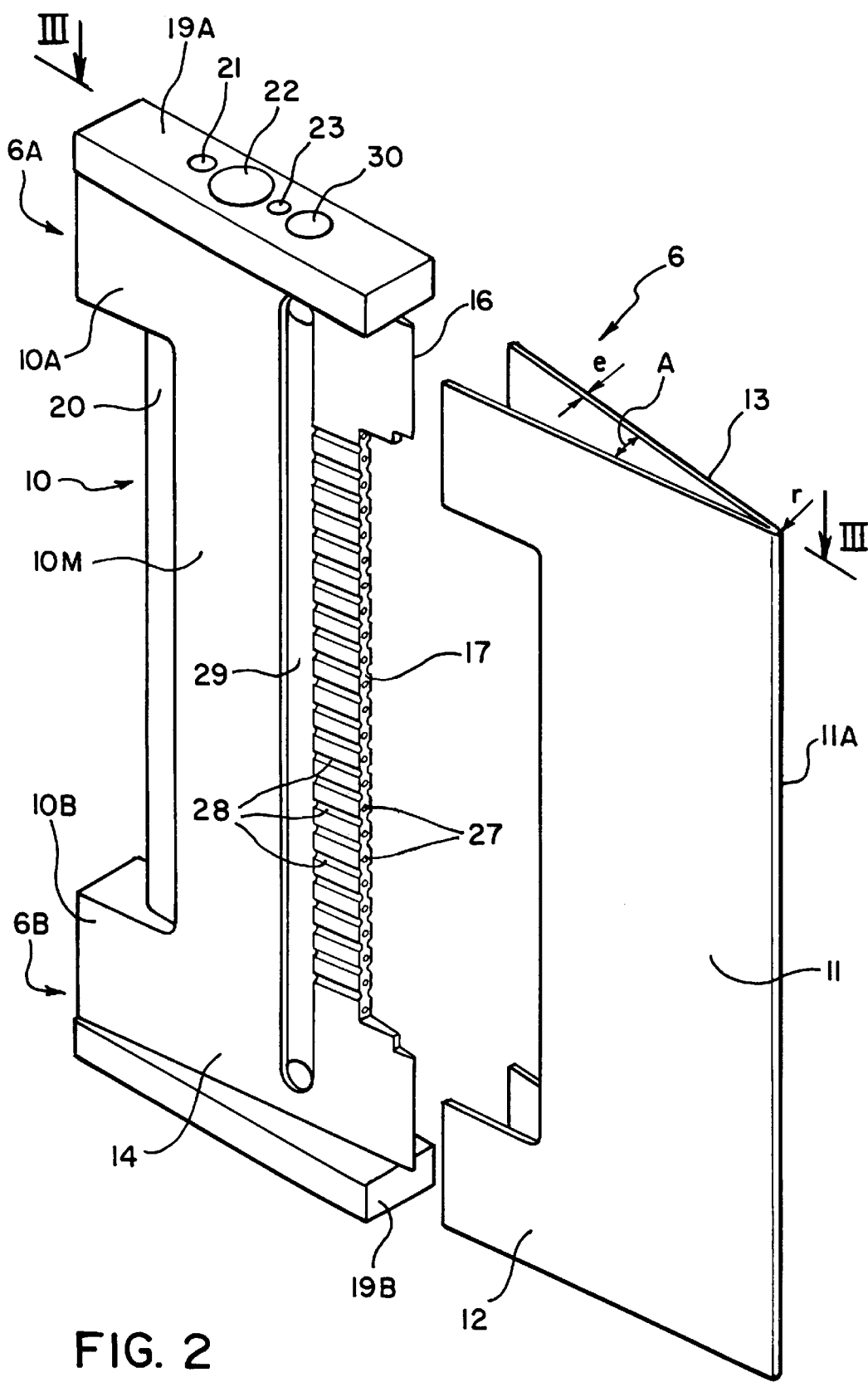
FIG. 2 is an exploded perspective view of an illustrative embodiment of the fuel injection stub according to the present invention.

The ramjet 1, shown in FIG. 1, is intended for propelling a hypersonic aircraft (not shown) which has to fly over a wide Mach number range, for example from about Mach 6 to a Mach number of about 12 to 15.

The ramjet 1 includes a casing 2 provided, at one of its ends, with an air intake 3 for an airflow (shown symbolically by arrows F) which has to be used as the oxidizer and, at its opposite end, with a nozzle 4. Downstream of the air intake 3, the casing 2 forms an injection chamber 5 in which two fuel injection stubs 6 are arranged transversely to the oxidizer flow F. The injection stubs 6 include a nose 7, which receives said oxidizer flow, and are fastened to the casing 2, via their ends 6A and 6B fixed to the internal face of two opposite walls 5A and 5B of the injection chamber 5. Between the injection chamber 5 and the nozzle 4, the casing 2 delimits a combustion chamber 8, in the upstream part of which are provided igniters (not shown). In their rear part (that is to say facing the combustion chamber 8), said injection stubs 6 include longitudinal injection rails (not visible in FIG. 1 but shown in FIGS. 3, 4 and 6).

Thus, the fuel is distributed over the entire oxidizer flow F, at the injection stubs 6, and the combustion of the flux of oxidizer/fuel mixture takes place in the combustion chamber 8, after which the combustion gases are expelled through the nozzle 4. It will be noted that, in the case of the lowest flight Mach numbers (up to Mach 8), it is possible to use kerosene as the fuel (optionally with hydrogen sparging so as to facilitate ignition of the ramjet and pluming of the jet) and, in the case of higher Mach numbers, it is then possible to use hydrogen as the fuel. Other fuels, such as methane, endothermic hydrocarbons and synthetic fuels, may also be employed for a ramjet of this type.

In the particular illustrative embodiment shown in FIG. 1, the casing 2 of the ramjet has, in its entirety, a shape of a duct of rectangular or square cross section, generally consisting of four walls, pairs of which are opposite each other (the walls are assumed to be transparent in this FIG. 1). It should be clearly understood that such a configuration is in no way limiting.

As mentioned above, the leading edge of the nose 7 of the injection stubs 6 is exposed to very high heat fluxes when the oxidizer flow corresponds to hypersonic flight. At Mach 12, the nose 7 is raised to a temperature of about 5000K.

FIGS. 2 to 7 illustrate an embodiment for an injection stub 6 according to the invention and capable of withstanding such high thermal stresses.

As shown in these figures, in this embodiment, the fuel injection stub 6 includes a one-piece body 10 in which, as will be seen later, fuel injectors, coolant injection means and means for removing this coolant are machined. The body 10 itself is machined from a block of carbon-carbon composite material, the fibrous structure of which is three-dimensional and the matrix of which is of densified pitch.

In addition, the stub 6 includes a nose piece 11 made of a material whose thermal conductivity through the thickness is about 70 W/(m.K), having the shape of a dihedron whose angle A is at most equal to 15°, for example equal to 12°. In addition, the thickness e of the faces of the nose piece 11 is at most equal to 2 mm, for example equal to 1.5 mm, and the radius r of the edge 11A of the piece 11 is at most equal to 2 mm. The piece 11 is intended to form the nose 7 of the stub 6, its edge 11A then being the leading edge of said nose.

As shown diagrammatically in FIG. 8, the nose piece 11 is formed by a carbon-carbon composite skin, the fibrous structure of which is woven, the weft yarns T being distributed at several levels in the thickness e of said skin and each of the warp yarns C of which passes around weft yarns T at different levels. In addition, the edge 11A is parallel with the weft yarns T. The matrix of the skin 11 is also of densified pitch.

Over its greater length, the body 10 has a wedge-shaped cross section, the angle of the wedge being equal to the angle A of the nose piece 11.

Thus, as shown in FIGS. 3 to 7, the faces 12 and 13 of the nose piece 11 are applied against the faces 14 and 15 of the body 10 when the two pieces 10 and 11 are joined together in a sealed manner, for example by means of adhesive and/or of screws (in a manner not shown).

The edge 16 of the wedge of the body 10 is indented and cut in the central part 10M of said body in order to form an end facet 17. Thus, when the pieces 10 and 11 are joined together, a sealed chamber 18 is delimited, in the concavity of the nose piece 11, between the internal surface of the faces 12 and 13 and the facet 17 of the body 10.

The ends 6A and 6B of the stub 6, which are intended to be anchored in the two opposite walls 5A and 5B of the injection chamber 5, correspond to enlarged parts 10A and 10B, on the opposite side from the edge 16, of the triangular central part 10M of the stub, said enlarged parts also being covered by the faces 12 and 13 of the nose piece 11, as well as to parallelepipedal end heads 19A and 19B, respectively supported by said enlarged parts 10A and 10B.

The central part 10M of the body 10 includes, on the opposite side from the facet 17, a longitudinal base rib 20 which projects from and is joined to the heads 6A and 6B.

The body 10 is drilled longitudinally by channels 21, 22 and 23.

Figure 3:
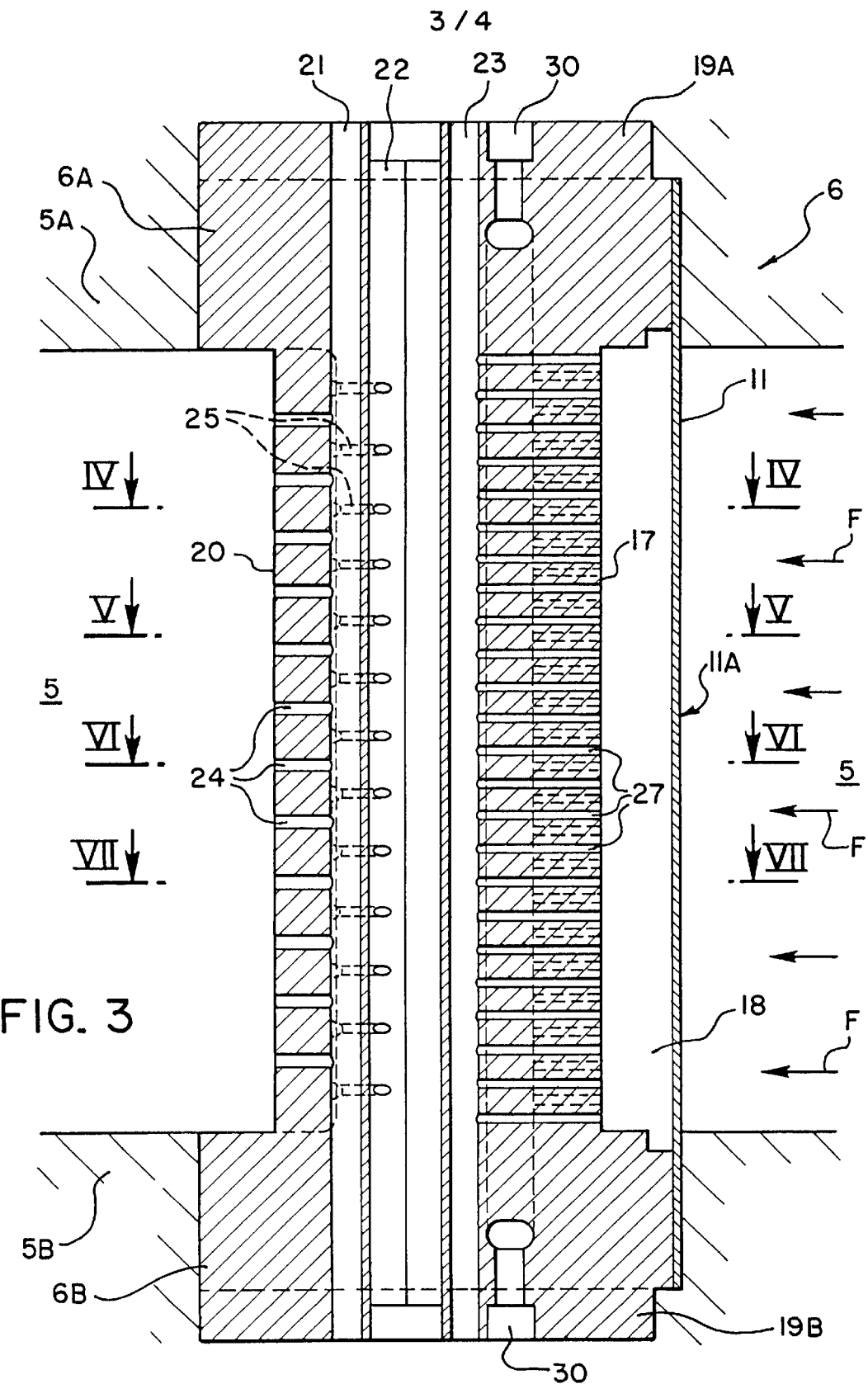
FIG. 3 is a central longitudinal section of the stub, joined together, in FIG. 2, on the line III—III in the latter.
Figure 6:
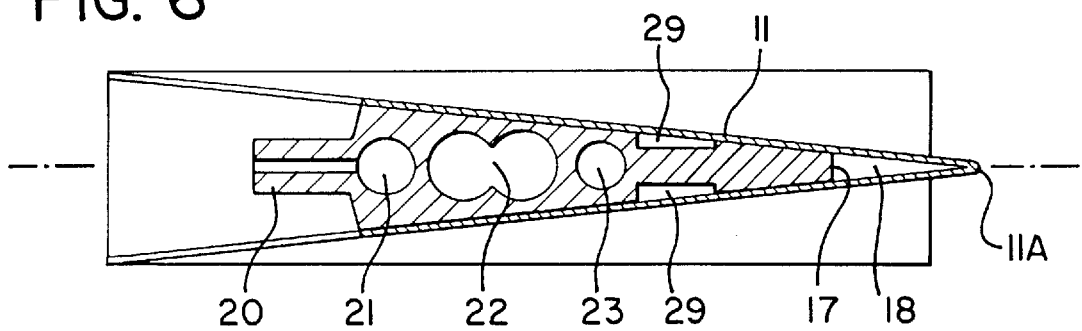

The longitudinal channel 21 communicates with a number of transverse channels 24 which are made in the rib 20 and distributed along the central part 10M of the body 10 (see FIGS. 3 and 6).

Figure 4:
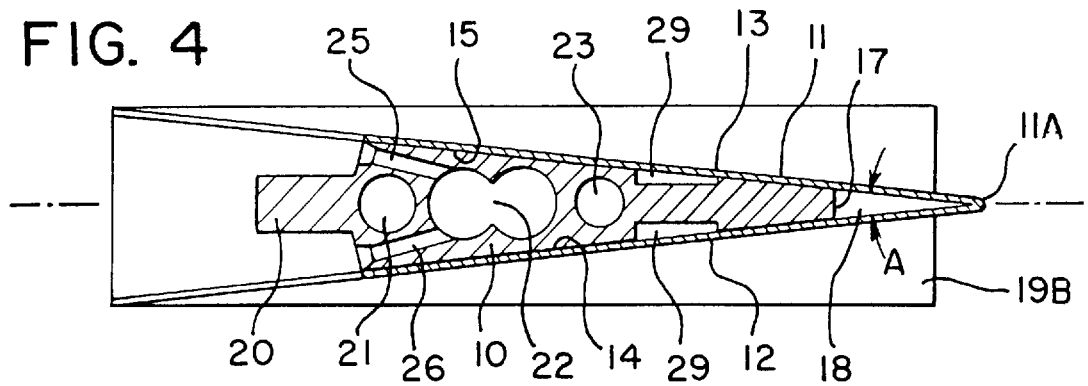
FIGS. 4, 5, 6 and 7 are cross sections of said fuel injection stub, corresponding respectively to the lines of section IV—IV, V—V, VI—VI and VII—VII in FIG. 3.
Figure 5:
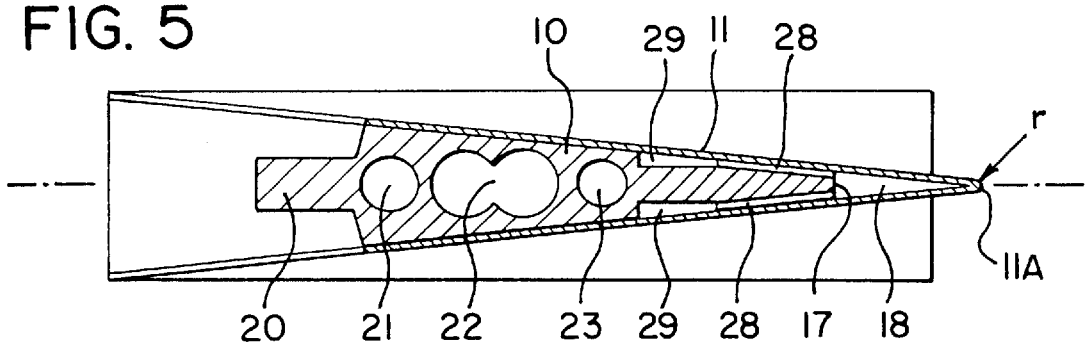

The longitudinal channel 22 communicates with a number of transverse channels 25 and 26 which emerge on each side of the longitudinal rib 20 (see FIGS. 3 and 4).

Figure 7:
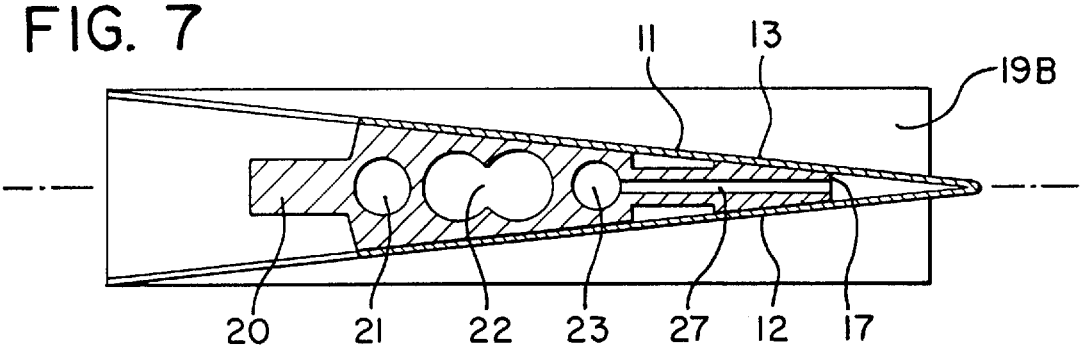

The longitudinal channel 23 communicates with a number of transverse channels 27 which emerge in the facet 17 and therefore in the sealed chamber 18 (see FIGS. 3 and 7).

Moreover, the walls 14 and 15 of the central part 10M of the body 10 include a number of transverse surface grooves 28 which connect said facet 17 to surface longitudinal grooves 29 which themselves are connected at their ends to longitudinal channels 30 emerging at the end of the heads 6A and 6B. The surface grooves 28 and 29 are closed off by the nose piece 11 (see FIGS. 3 and 5).

It will be readily understood that, when fuel is injected into the channels 21 and 22 it is also injected into the chamber 5, in the direction of the combustion chamber 8, respectively by the transverse channels 24 and 25 which each behave as an elementary injector. Likewise, when a coolant is injected into the longitudinal channel 23, this coolant is injected into the sealed chamber 18 via the transverse channels 27. The coolant injected into the chamber 18 is recovered via the transverse grooves 28 and runs via these into the longitudinal grooves 29. It can therefore be evacuated via the channels 30.

Of course, although in FIG. 3 the channels 21, 22, 23 and 30 have been shown open at their two ends, it is possible to close off one or other of said ends.

According to an important feature of the present invention, the coolant, for example low-temperature hydrogen, is at a pressure (for example of about 10 bar) such that the jets of coolant coming out of the channels 27 pass through the sealed chamber 18 and strike the internal surface of the faces 12 and 13 of the nose piece 11, at least near the edge 11A. As stated above, the coolant flow rate must, of course, be sufficient for the temperature of the nose piece 11 to remain between 1000° C. and 2000° C. under flight conditions at a high Mach number. In the case in which the coolant is hydrogen, such a flow rate must be several grams per second and per cm of length of leading edge 11A.

Such a coolant may be the fuel used to feed the combustion chamber 8. In this case, the coolant feeding the injection means 23, 27 is taken off from the circuit feeding the injection rail 21, 22, 24, 25 and 26. Preferably, the flow rate of fuel used as coolant is less than 20% of the total flow rate of fuel injected into the combustion chamber 8.

I claim:

1. A fuel injection stub (6) for a ramjet (1) which is designed to operate at a high Mach number and which includes a combustion chamber (8) into which an oxidizer flow (F) is introduced, said stub including a nose (7) receiving said oxidizer flow and forming a rail of elementary fuel injectors, said rail being arranged in said oxidizer flow transversely to the latter and distributing said fuel in said oxidizer flow, which includes:

a body (10) of carbon-carbon composite, in which said rail of elementary injectors is arranged, and which, at least on the side where said nose is located, has a cross section in the shape of a wedge, the angle of which is at most equal to 15° and the edge (16) of which is cut over at least part of its length in order to form at least one end facet (17); and a nose piece (11) consisting of a thin skin of carbon-carbon composite in at least approximately the shape of a dihedron, the edge (11A) of which has a radius of curvature (r) at most equal to 2 mm and the angle of which is equal to that of said wedge;

wherein said skin is joined to said body, in a sealed manner, with its faces (12, 13) pressed against the faces (14, 15) of said wedge so that a sealed chamber (18) is delimited, in the concavity of said skin, between the latter and said end facet (17) of said body; and wherein, in said body (10), there are arranged:

means (23, 27) for injecting a coolant into said sealed chamber (18), these injection means comprising nozzles arranged in said facet (17) of said body in order to produce a number of jets of pressurized coolant which are distributed along said facet and strike the concave face of said skin (11), at least in the region of its edge (11A); and means (28, 29, 30) for removing said coolant after impact of said jets against the concave face of said skin.

2. The injection stub as claimed in claim 1, wherein said carbon-carbon composite skin, from which said nose piece is formed, comprises:

a woven fibrous structure, the weft yarns (T) of which are distributed at several levels in the thickness (e) of said skin and each of the warp yarns (C) of which passes around weft yarns (T) at different levels; and a matrix which encapsulates said fibrous structure and consists of pyrolyzed and graphitized pitch.

3. The injection stub as claimed in claim 2, wherein the edge (11A) of the nose piece is parallel with the weft yarns (T) of said skin.

4. The injection stub as claimed in claim 1, wherein the thickness (e) of said skin is at most equal to 2 mm.

5. The injection stub as claimed in claim 1, wherein the thermal conductivity of the constituent carbon-carbon composite material of said skin (11), transversely to the latter, is about 70 W/(m.K).

6. The injection stub as claimed in claim 1, wherein said body (10) of carbon-carbon composite material is formed from a three-dimensional fibrous structure encapsulated in a matrix of pyrolyzed and graphitized pitch.

7. The injection stub as claimed in claim 1, wherein said skin (11) and said body (10) of carbon-carbon composite material are joined together by adhesive bonding by means of a carbon adhesive.

8. The injection stub as claimed in claim 7, wherein the whole of said skin adhesively bonded to said body is protected against oxidation.

9. The injection stub as claimed in claim 1, wherein the coolant is a low-temperature gas.

10. The injection stub as claimed in claim 1, for an aircraft having to fly at Mach 12, the nose of said stub having to withstand a temperature close to 1500° C., wherein:

the skin (11) makes a dihedral angle (A) of 12° and has a leading-edge radius (r) equal to 1.5 mm;

the skin has a thickness (e) of about 1 mm and its constituent carbon-carbon composite material has a transverse thermal conductivity of about 70 W/(m.K);

the coolant is hydrogen at a temperature of 100K to 300K and at a pressure of about 10 to 15 bar; and the flow rate of the coolant is about 2 to 5 g/s for each cm of length of said leading edge.

11. The injection stub as claimed in claim 1, wherein the coolant consists of fuel.

12. The injection stub as claimed in claim 1, wherein said means for removing the coolant include:

at least one longitudinal groove (29) made on the surface of said body (10) and closed off by one face of said skin (11); and an array of transverse surface grooves (28) bringing said sealed chamber (18) into communication with said longitudinal groove (29) and also closed off by said skin.

13. The injection stub as claimed in claim 1, wherein said fuel injection rail and said coolant injection means include longitudinal feed channels (21, 22, 23) and transverse injection channels (24 to 27), all these being made in said body of the stub.

14. The injection stub as claimed in claim 1, wherein said fuel injection rail is arranged on that side of said stub which is opposite said nose.

15. The injection stub as claimed in claim 14, wherein said fuel injection rail includes series of separate elementary injectors, some of them (injectors 24) injecting fuel in the direction of the oxidizer flow and the others (injectors 25 and 26) injecting fuel obliquely into said flow.

16. The injection stub as claimed in claim 1, wherein the body (10) of said stub includes, on the side opposite said nose, a projecting central longitudinal base rib (20), wherein at least one series of elementary injectors (24) injecting fuel in the direction of the oxidizer flow is arranged in said base rib and wherein at least two series of elementary injectors (25, 26) injecting fuel obliquely into said flow are arranged on each side of said base rib.

17. The injection stub as claimed in claim 1, wherein said body (10) of the injection stub includes, at its ends, heads (6A, 6B) which are designed to anchor the stub in opposite walls (5A, 5B) of said ramjet and to feed said stub with fuel and coolant and wherein said nose piece (11) covers at least part of said heads.

* * * * *